(12) United States Patent
Nordholm et al.

(10) Patent No.: US 12,227,105 B2
(45) Date of Patent: Feb. 18, 2025

(54) METHOD FOR DETERMINING A DERATING FACTOR, A CONTROL UNIT, A POWER SYSTEM AND A VEHICLE

(71) Applicant: VOLVO TRUCK CORPORATION, Gothenburg (SE)

(72) Inventors: Linus Nordholm, Gothenburg (SE); Simon Berntsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 540 days.

(21) Appl. No.: 17/653,381

(22) Filed: Mar. 3, 2022

(65) Prior Publication Data
US 2022/0289071 A1 Sep. 15, 2022

(30) Foreign Application Priority Data
Mar. 10, 2021 (EP) .................................. 21161700

(51) Int. Cl.
*B60L 58/16* (2019.01)
*B60L 53/62* (2019.01)
*H02J 7/00* (2006.01)

(52) U.S. Cl.
CPC ............ *B60L 58/16* (2019.02); *B60L 53/62* (2019.02); *H02J 7/0047* (2013.01); *H02J 7/0063* (2013.01)

(58) Field of Classification Search
USPC ......................................................... 320/109
See application file for complete search history.

(56) References Cited

U.S. PATENT DOCUMENTS

| 4,313,080 A | * | 1/1982 | Park | B60L 53/11 180/65.225 |
| 6,417,668 B1 | * | 7/2002 | Howard | H02J 7/14 324/426 |
| 2009/0139781 A1 | * | 6/2009 | Straubel | B60L 53/14 701/22 |

(Continued)

FOREIGN PATENT DOCUMENTS

| JP | 2005218171 A | 8/2005 |
| KR | 20200066476 A | 6/2020 |
| WO | 2020043775 A1 | 3/2020 |

OTHER PUBLICATIONS

European Search Report dated Oct. 7, 2021 in corresponding European Patent Application No. 21161700.6, 13 pages.

*Primary Examiner* — Mohammed Alam

(74) *Attorney, Agent, or Firm* — Venable LLP; Jeffri A. Kaminski

(57) ABSTRACT

A method for determining a derating factor for a rechargeable energy storage system. The derating factor is indicative of the rate at which an electrical load, imparted on said rechargeable energy storage system, is reduced, said rechargeable energy storage system being associated with at least a first load threshold and at least a second load threshold being located further away from a zero electrical load value than the first load threshold. The method includes determining a safety margin value by combining an accumulated first load value and an accumulated second load value and relating the thus combined values with said operating time range, and comparing said safety margin value to at least one safety margin threshold value in order to determine whether or not said derating factor should be modified.

14 Claims, 3 Drawing Sheets

(56) References Cited

U.S. PATENT DOCUMENTS

| | | | |
|---|---|---|---|
| 2012/0126742 A1* | 5/2012 | Reggio | H02M 3/33573 |
| | | | 320/103 |
| 2014/0183938 A1 | 7/2014 | Peswani | |
| 2021/0167590 A1* | 6/2021 | Schweitzer, III | H02J 9/068 |
| 2022/0289071 A1* | 9/2022 | Nordholm | H02J 7/0047 |

* cited by examiner

METHOD FOR DETERMINING A DERATING FACTOR, A CONTROL UNIT, A POWER SYSTEM AND A VEHICLE

TECHNICAL FIELD

The present disclosure relates to a method for determining a derating factor for a rechargeable energy storage system and to a method for operating a rechargeable energy storage system. The present disclosure also relates to a control unit configured to monitor and control an electrical load, a computer program, a computer readable medium, a power system comprising the control unit and an electrically powered vehicle or vessel comprising the control unit and/or the power system.

BACKGROUND

Rechargeable Energy Storage Systems (RESS) require special consideration for controlling power outtake, especially during transient conditions, to avoid impacting the State of Health (SoH) of the storage system, e.g. batteries. This is particularly true for applications using a rechargeable energy storage system for traction of vehicles or marine vessels, but it may also be required for other applications where a rechargeable energy storage system frequently supplies electrical loads, such as gensets and similar systems.

Attempts have been made to extend battery life in vehicles. JP2005218171 relates to reducing a maximum value of current output from a battery, and to extend the life of the battery. A current output threshold is determined while traveling. If a detected current output is above the threshold, current output to electrical loads of the vehicle is suppressed according to a priority list.

However, it would be desired to further refine the control methods for electrical loads.

SUMMARY

Therefore, an object of the disclosure is to provide a method for determining a derating factor for a rechargeable energy storage system. More specifically, an object of the disclosure is to provide a method allowing appropriate use of buffer zones of a rechargeable energy storage system without unnecessarily limiting electrical loads and without unnecessarily impacting the State of Health of the rechargeable energy storage system. Another object of the disclosure is to provide a method for operating the rechargeable energy storage system. Further aspects of the disclosure are to provide a control unit for controlling electrical loads according to the method, to provide a power system comprising the control unit and to provide a vehicle or a vessel comprising the control unit and/or the power system.

According to a first aspect of the disclosure the object is achieved by a method for determining a derating factor for a rechargeable energy storage system. The derating factor is indicative of the rate at which an electrical load, imparted on said rechargeable energy storage system, is reduced. The rechargeable energy storage system is associated with at least a first load threshold and at least a second load threshold which is located further away from a zero electrical load value than the first load threshold. The method comprises for an operating time range of the rechargeable energy storage system, detecting the electrical load and:
when the electrical load is equal to the first load threshold or is located between the electrical first load threshold and the second load threshold, determining an accumulated first load value indicative of the time during which, as well as the magnitude of how much, the electrical load extends from the first load threshold,
when the electrical load is equal to said second load threshold or is located further away from a zero electrical load value than the second load threshold, determining an accumulated second load value indicative of the time during which, as well as the magnitude of how much, the electrical load extends from the second load threshold,
determining a safety margin value by combining the accumulated first load value and the accumulated second load value and relating the thus combined values with the operating time range, and
comparing the safety margin value to at least one safety margin threshold value in order to determine whether or not the derating factor should be modified.

The electrical load is a consumer of electric power/current connected to the rechargeable energy storage system. The detected electrical load may have a positive or a negative value depending on whether the rechargeable energy storage system is charging or discharging. Thus, when the value of the electrical load is located away from the zero electrical load value, the value may be either positive or negative. It follows that any load thresholds may also be positive or negative.

A load threshold according to the present disclosure represents a load value at, or beyond, which the derating factor is determined and used, i.e. at or beyond which the electrical load is derated. If the load value is detected between the zero electrical load value and the first load threshold, derating is unnecessary.

The first load threshold thus defines a lower threshold of a first buffer of the rechargeable energy storage system, where the electrical load and any load thresholds may be either positive or negative. Any further load thresholds farther away from the zero electrical load value than the first load threshold constitute lower limits of respective further buffers. Accordingly, the second load threshold defines a lower limit of a second buffer. The second load threshold also defines an upper limit of the first buffer. The lower limit of a buffer is closer to the zero electrical load value than the upper limit of the same buffer. The limits of the buffers, i.e. the load thresholds, may be set by the manufacturer of the rechargeable energy storage system, but they may also be set and/or modified by a control unit of the system depending on operating conditions, or depending on the detected electrical load of the system. For instance, a high detected load value may generate further load thresholds and buffers.

The derating factor is a factor that is used to limit an electrical load of the rechargeable energy storage system in order to minimize State of Health degradation, where "State of Health", or SoH, is a measure of the condition of a rechargeable energy storage system, such as a battery. By determining the derating factor according to the method of the present disclosure there is provided a possibility of controlling an electrical load connected to the system in a dynamical manner to return potentially damaging power/current consumption to acceptable consumption. The electrical load is allowed to use any buffers of the rechargeable energy storage system to an extent. If the buffers are used marginally, and/or for short periods of time, the derating factor may be decreased to only slowly derate the load. On the other hand, if the load values increase quickly, or if they exceed one of the load thresholds for a longer time, the derating factor will be increased to derate the load faster and return to a load value between the zero electrical load value and the first load threshold. The buffers may thus be used in a more efficient way while protecting the State of Health of the rechargeable energy storage system. In addition, the need to reserve a part of the system's power capability for transients is also reduced.

The safety margin value is an indication of the magnitude of the use of the buffers over time and determines whether or not the derating factor should be modified.

Optionally, a high safety margin value yields an increased derating factor, a moderate safety margin value yields a maintained derating factor, and a low safety margin value may yield a reduced derating factor. Also, a very high safety factor may significantly increase the derating factor to quickly return the electrical load to acceptable, i.e. non-harmful, levels.

Optionally, the electrical load is indicative of electric current, alternatively electric power. The electrical load is an electrical component or system connected to the rechargeable energy storage system. Detection of the electrical load may therefore be synonymous to detecting current consumption or power consumption of the system. Consequently, derating the electrical load may mean to control operation of the load, e.g. consumption of the load, to a level lower than its maximum capacity. Under some conditions, derating the electrical load may mean to turn off/switch off the load completely.

Optionally, the feature of combining said accumulated first load value and said accumulated second load value comprises multiplying said accumulated first load value by a first weight factor and multiplying said accumulated second load value by a second weight factor. The weight factors determine the significance of the accumulated first and second load values in view of the State of Health of the rechargeable energy storage system. Exceeding a load threshold may therefore affect the derating factor to greater or lesser degree depending on the weight factor associated with said load threshold (i.e. buffer).

Optionally, the first weight factor and the second weight factor are determined dynamically in dependence of operating conditions. In this manner, exceeding a certain load threshold may be more or less acceptable in some operating conditions of the rechargeable energy storage system as compared to other operating conditions. Operating conditions herein mean conditions under which the rechargeable energy storage system operates, such as weather, ambient temperature, temperature of the rechargeable energy storage system, characteristics of connected electrical loads, inclination of a vehicle comprising the rechargeable energy storage system, etc.

Optionally, the operating time range and/or said at least first load threshold and second load threshold are determined dynamically in dependence of operating conditions of the rechargeable energy storage system. Similarly to the above, the load thresholds and the operating time range may be set dynamically, such that buffer zones in which the electrical load is derated are determined dynamically. Accordingly, if some operating conditions allow a greater or smaller part of the rechargeable energy storage system to be used without harmful effects, the dynamical setting of the buffers allows a more efficient use of the rechargeable energy storage system.

According to second aspect of the present disclosure, there is provided a method for operating a rechargeable energy storage system. The rechargeable energy storage system is associated with at least a first load threshold and at least a second load threshold which is located further away from a zero electrical load value than the first load threshold. The method comprises determining a current electrical load value for said rechargeable energy storage system, and if the current electrical load value is equal to first load threshold, or located further away from the zero electrical load value than the first load threshold, derating the at least one electrical load, using a derating factor at least until the electrical load value is located closer to the zero electrical load value than the first load threshold, wherein the derating factor has been determined in accordance with the method of the first aspect of the present disclosure.

In accordance with the above, when the electrical load is detected at a level which may be harmful to the rechargeable energy storage system, operation of the electrical load is limited (derated) towards a level which is closer to the zero electrical load value, i.e. towards a lower current or power consumption of the component of system connected to the rechargeable energy storage system. This reduces the impact of high current or power consumption on the State of Health of the rechargeable energy storage system.

Optionally, the feature of derating a plurality of electrical loads, the plurality of electrical loads are derated according to a dynamic or static priority list, using the derating factor, until the electrical load value of the plurality of electrical loads is located closer to said zero electrical load value than said first load threshold. The electrical load of the rechargeable energy storage system is the total load connected to the system. The term "electrical load" may thus mean a plurality of electrical loads, i.e. electric equipment, components or systems, which are connected to the rechargeable energy storage system. If more than one electrical load needs to be derated, the provision of a priority list, either dynamic or static, allows more important components or equipment to keep operating at normal capacity, while other components or equipment are derated, or even switched off.

According to a third aspect of the present disclosure, there is provided a control unit configured to monitor and control at least one electrical load imparted on a rechargeable energy storage system according to the steps of the first and/or second aspects of the present disclosure.

The control unit is provided with processing capability and may be connected to sensors and measurement systems for determining operating conditions rechargeable energy storage system. The control unit further controls the distribution of power from the electric energy storage system to the electrical load and administers the derating of the electrical load. In other words, the control unit controls the determination of the derating factor and the derating of the electrical load.

The control unit may also be connected to a computer readable medium having stored thereon a computer program, which comprises code to cause the control unit to execute any of the method steps of the present disclosure.

According to a fourth aspect of the present disclosure, there is provided a power system which comprises a control unit according to the third aspect of the present disclosure, a rechargeable energy storage system, and an interface connectable to at least one electrical load. Optionally, the power system further comprises the at least one electrical load.

The power system may be a power system of a fully or partly electrically powered vehicle or vessel, such as a marine vessel having one or more on-board electrical loads. Alternatively, the power system may be a stand-alone power system, such as a stationary or mobile rechargeable genset, which may be used where power is needed, for instance in places where power outages are frequent, and/or where an outage can cause especially significant or dangerous problems, such as in a mine or in a hospital. In such situations, external electrical loads need to be supplied with power from the power system.

According to a fifth aspect of the present disclosure, there is provided an electrically powered vehicle or vessel comprising the control unit and/or the power system of the present disclosure.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE INVENTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
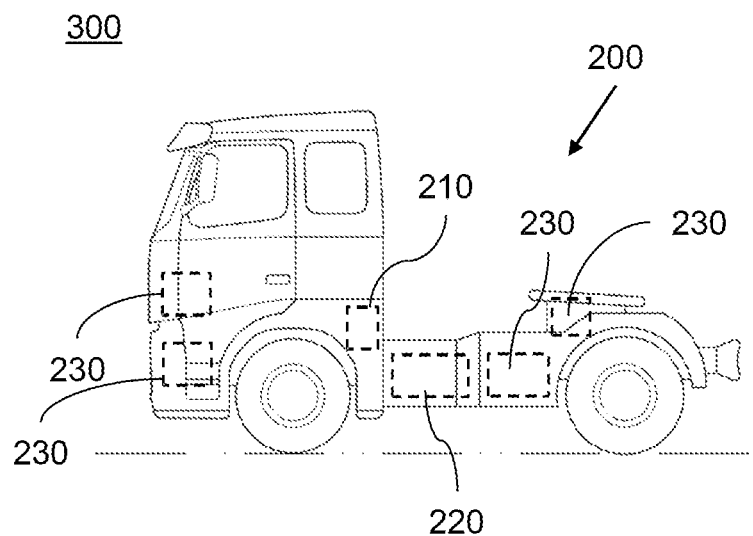
FIG. 1 shows a vehicle comprising a power system of the present disclosure

FIG. 1 shows a side view of an electrically powered vehicle 300, comprising a power system 200, which in turn comprises a control unit 210 The control unit 210 is configured to control electric distribution of electric power from a rechargeable energy storage system 220, such as at least one battery, to at least one electrical load 230. The at least one electrical load 230 may be one or more of an electrical propulsion system of the vehicle 300, or an auxiliary load, such as a thermal system, and/or a power take-off of the vehicle 300. As shown in FIG. 1, a plurality of electrical loads 230 may be connected simultaneously and consume varying amounts of power delivered by the rechargeable energy storage system 220. There may be thermal systems for heating or cooling of a cab or of a cargo hold of the vehicle 300. Power take-offs, such as electrical equipment, machines and tools may also be connected. Power distribution to these systems, i.e. to the electrical loads 230, may need to be derated by the control unit 210 under certain conditions of increased usage of the rechargeable energy storage system 220, in order to avoid impacting the State of Health of e.g. a battery of the rechargeable energy storage system 220.

Figure 2:
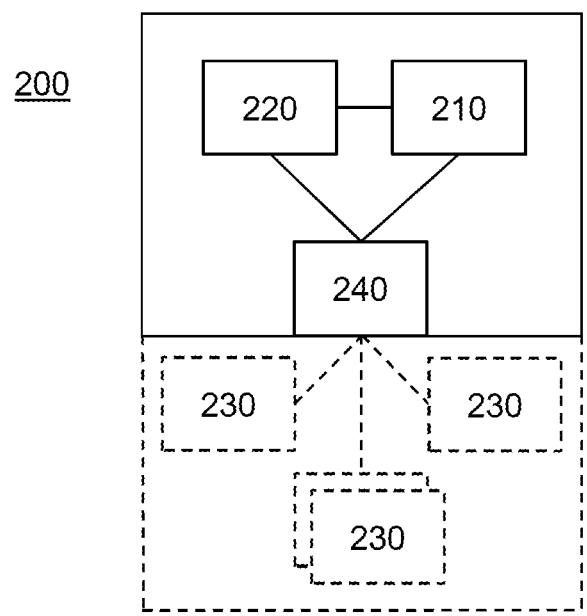
FIG. 2 shows a schematic view of a power system according to the present disclosure

As shown in FIG. 2, the control unit 210 is connected to other parts of the power system 200 of the electrically powered vehicle 300. The control unit 210 controls the distribution of power to or from the rechargeable energy storage system 220 to the at least one electrical load 230 via an interface 240. In FIG. 2, electrical loads 230 are depicted in dashed lines to illustrate that they may be an integrated part of the power system 200, or they may be auxiliary/external loads that are connectable to the power system 200 via the interface 240. For integrated electrical loads 230, the interface 240 may be exemplified by cables and buses, e.g. a traction voltage bus for a traction voltage system of an electric vehicle. For auxiliary loads, the interface 240 may for instance be an electrical connector or an electric Power Take-Off (ePTO).

To ensure that the at least one electrical load 230 does not overuse the capability of the rechargeable energy storage system 220, the control unit 210 manages derating/limiting of power to the electrical load(s) 230 such energy consumption of the electrical load(s) 230 is controlled within certain limits, herein also called load thresholds, of the rechargeable energy storage system 220. A manufacturer of the rechargeable energy storage system 220 may provide the system with recommended limits/load thresholds for power outtake within which limits electrical load(s) 230 may operate to an extent. Within the limits, the manufacturer guarantees a certain lifetime of the rechargeable energy storage system 220. In order to optimize usage of rechargeable energy storage system 220 for a certain application, these limits may be set when configuring the system 220 during installation, such as when installing the rechargeable energy storage system 220 in a vehicle 300 having a particular set of electrical loads 230. The limits/load thresholds may also be set dynamically depending on operating conditions. Such operating conditions are usually known and may be predefined and detectable by the control unit 210 of the vehicle 300. The limits/load thresholds may be set appropriately according to the operating conditions combined with characteristics of the power system 200 its application, i.e. connected electrical loads 230.

The present disclosure provides a method for optimizing the power ability of the rechargeable energy storage system 220, such that power is not needlessly kept in reserve. At the same time, the method minimizes an added impact to the State of Health of the system 220, which is due to an increased power outtake because the method allows the limit/load thresholds to be exceeded in a controlled manner.

Figure 3:
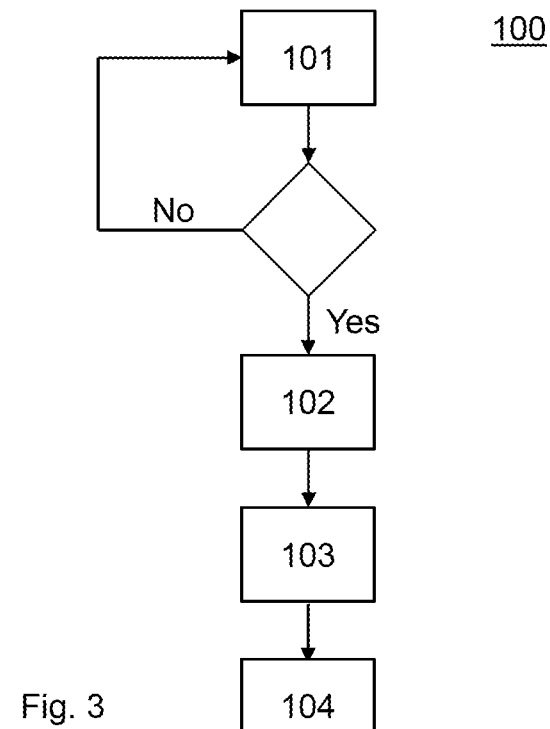
FIG. 3 shows flowchart of a method according to a first aspect of the present disclosure

FIG. 3 shows a flow chart of an exemplary embodiment according to the present disclosure. See also FIG. 5, which shows a graph of an exemplary usage of the rechargeable energy storage system 220. A method 100 for determining a derating factor for a rechargeable energy storage system 220 is illustrated. The derating factor is indicative of the rate at which an electrical load 230, imparted on said rechargeable energy storage system 220, is reduced. The rechargeable energy storage system 220 is associated with at least a first load threshold $T_1$ and at least a second load threshold $T_2$ which is located further away from a zero electrical load value than the first load threshold $T_1$. The method 100 comprises, for an operating time range of said rechargeable energy storage system 220, detecting 101 the electrical load 230, and when the electrical load 230 is equal to said electrical first load threshold $T_1$ or is located between said electrical first load threshold $T_1$ and said second load threshold $T_2$, determining 102 an accumulated first load value $L_1$ indicative of the time during which, as well as the magnitude of how much, said electrical load extends from said first load threshold $T_1$. When the electrical load 230 is equal to the second load threshold $T_2$ or is located further away from a zero electrical load value than said second load threshold $T_2$, determining 103 an accumulated second load value $L_2$ indicative of the time during which, as well as the magnitude of how much, said electrical load 230 extends from said second load threshold $T_2$. The method further comprises determining 104 a safety margin value SM by combining said accumulated first load value $L_1$ and said accumulated second load value $L_2$ and relating the thus combined values with said operating time range, and comparing 105 said safety margin value SM to at least one safety margin threshold value SMT in order to determine whether or not said derating factor should be modified.

Thus, as outlined hereinbefore, the first load threshold $T_1$ and the second load threshold $T_2$ may be predetermined static thresholds or they may be determined dynamically in dependence of operating conditions of the rechargeable energy storage system 220. In the latter case, they may be determined at every time sample in order to provide optimal threshold values for the existing operating conditions.

In the exemplary embodiment of FIG. 3, at least two load thresholds $T_1$, $T_2$ are disclosed, but any further number of thresholds may be employed. The step of detecting 101 the electrical load 230 may comprise the additional measure of determining a number, N, of additional load thresholds $T_3 \ldots T_N$.

Obviously, if the electrical load 230 is detected 101 as a positive electrical load 230, only positive load thresholds, i.e. $+T_n$, are relevant for the method 100 for determining the derating factor, where $T_n$ indicates any particular load threshold used in the method. Similarly, if the electrical load 230 is detected 101 as a negative electrical load 230, only negative load thresholds, i.e. $-T_n$, are relevant for the method 100 for determining the derating factor.

The derating factor may either be increased, reduced or maintained in dependence of the determined safety margin value SM. An increased derating factor results in a stronger derating of the electrical load(s) 230 than previously, because the safety margin value SM indicates that the power ability of the rechargeable energy storage system 220 is being overused. A decreased derating factor results in a lower derating of the electrical load(s) 230 than previously, because the safety margin value SM indicates that the power ability of the rechargeable energy storage system 220 is not used enough. A maintained derating factor indicates that the rechargeable energy storage system 220 is being optimally used. A maintained derating factor still means that the electrical load D is being derated if detected further away from at least the zero electrical load value than the first load threshold $T_1$, but at an optimal rate.

The load value of the electrical load 230 is indicative of electric current, alternatively electric power. In other words, the electrical load 230 imparted on the rechargeable energy storage system 220 may be detected as current consumption, alternatively as power consumption by the electrical load 230 connected to, or comprised in, the rechargeable energy storage system 220.

The operating time range during which the method is applied may be static and determined in advance. It may optionally be determined dynamically in dependence of operating conditions of the rechargeable energy storage system.

The step of combining the accumulated first load value $L_1$ and the accumulated second load value $L_2$, e.g. into an accumulated weighted load value $L_w$, may comprise multiplying the accumulated first load value $L_1$ by a first weight factor $w_1$ and multiplying the accumulated second load value $L_2$ by a second weight factor $w_2$. A weight factor $w_n$ may be static a static weight factor for a corresponding load threshold $T_n$. Alternatively, each weight factor $w_n$ may be determined dynamically at the time of determining the corresponding load threshold $T_n$. In this way, the severity of exceeding any load threshold $T_n$ may appropriately affect the safety margin value SM. Consequently, the derating factor will be determined such that exceeding higher load thresholds $T_n$, in most scenarios, leads to a more severe derating of the electrical load(s) 230. However, under some conditions it is conceivable that a higher load threshold $T_n$ may be provided with a relatively low weight factor $w_n$.

As an example of the method illustrated in FIG. 3, the steps may be carried out using the algorithms below. This is further illustrated in FIG. 5. The vertical axis shows how the load L on the electric energy storage system 220 varies over time t (horizontal axis). The load may be positive, such as when charging, or negative, such as when discharging the rechargeable energy storage system 220. The unit detected and evaluated for the electrical load 230 may for instance be current or power.

When the current exceeds the first load threshold $T_1$, either when charging or discharging, there is a need to start evaluating the electrical load 230 to not overuse the rechargeable energy storage system 220 and thereby utilize additional State of Health.

The accumulated first load value $L_1$ may be determined by $$L_1 = \sum_{t=t_{01}}^{t_{c1}} |L_{current,t} - T_{1,t}|$$

$L_1$ The accumulated first load value
$t_{01}$ The time when the first load threshold $T_1$, is exceeded and a load value beyond the first load threshold T1 is detected
$t_{c1}$ The time when the first load threshold T1, is subceeded and a load value beyond the first load threshold T1 is not detected anymore
$L_{current,t}$ Actual load value at time sample t
$T_{1,t}$ Actual first load threshold T1 (value) at time sample t When the current exceeds the second load threshold $T_2$, either when charging or discharging, there is a stronger need to start evaluating the electrical load to not overuse the rechargeable energy storage system 220 and thereby utilizing the rechargeable energy storage system 220 without affecting the State of Health to a larger extent.

The accumulated second load value $L_2$ may be determined by $$L_2 = \sum_{t=t_{02}}^{t_{c2}} |L_{current,t} - T_{2,t}|$$

$L_2$ The accumulated first load value
$t_{02}$ The time when the second load threshold $T_2$, is exceeded and a load value beyond the second load threshold $T_2$ is detected
$t_{c2}$ The time when the first load threshold $T_2$, is subceeded and a load value beyond the first load threshold $T_2$ is not detected anymore
$L_{current,t}$ Actual load value at time sample t
$T_{2,t}$ Actual first load threshold $T_1$ (value) at time sample t The accumulated first load value $L_1$ and the accumulated second load value $L_2$ may optionally be weighted to reflect the severity of exceeding in the first load threshold $T_1$ and the second load threshold $T_2$, respectively. This yields the accumulated weighted load value $L_w$:

$$L_w = w_1 * L_1 + w_2 * L_2$$

Figure 5:
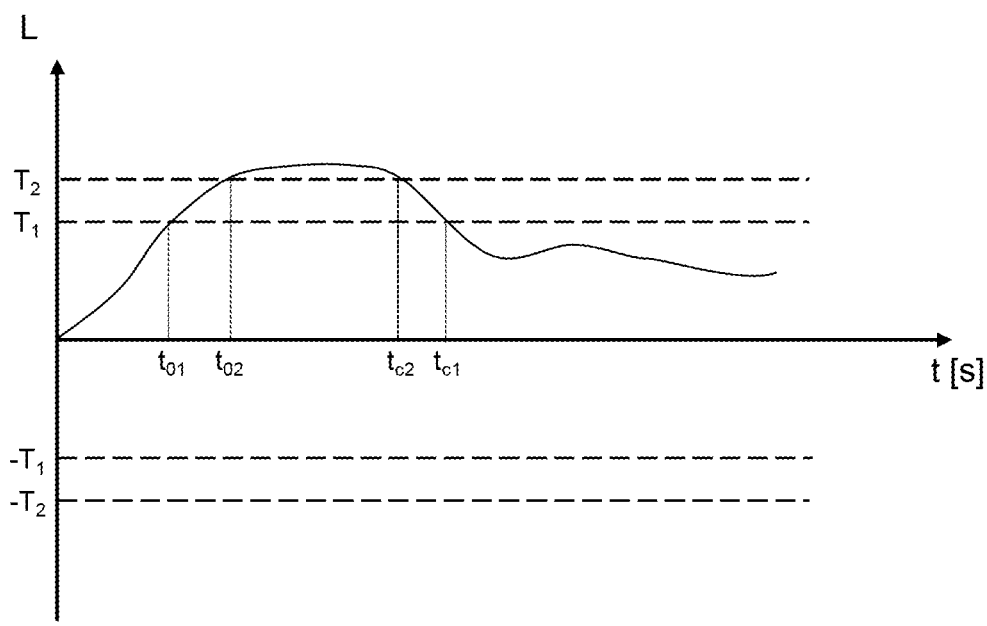
FIG. 5 shows an exemplary application of the method of FIG. 4

$L_w$ The accumulated weighted load value
$w_1$ Weight factor for exceeding the first load threshold $T_1$
$w_2$ Weight factor for exceeding the first load threshold $T_2$ The safety margin value SM may then optionally be calculated as the ratio between the accumulated weighted load value and the unweighted accumulated load value $L_w$area, which equals the area between the plotted curve and the first load Threshold $T_1$ in FIG. 5.

$$SM = \frac{L_w}{L_w area}$$

$L_w$area The unweighted accumulated load value ($L_1+L_2$)

When the safety margin value SM is determined 103 the derating factor may be determined by comparing 104 the safety margin value SM to at least one safety margin threshold value SMT. Thereby it is determined how severely to derate the electrical load(s) 230. The step of comparing 104 the safety margin value with the at least one safety margin threshold value SMT may, for instance, be carried out according to the example below.

Figure 4:
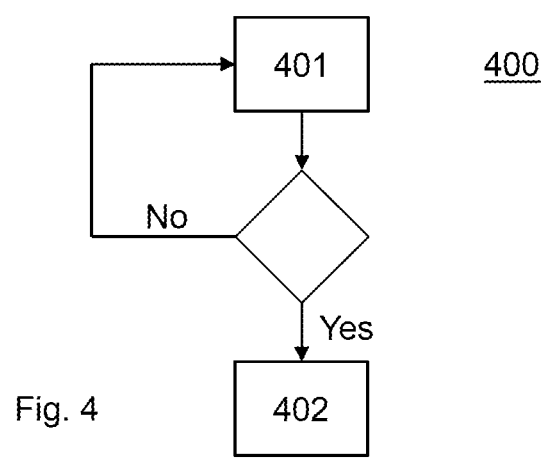
FIG. 4 shows a flowchart of a method according to a second aspect of the present disclosure

1.0≤SM The derating factor is increased by a large factor because the State of Health may be affected 0.8≤SM<1.0 The derating factor is increased 0.5≤SM<0.8 The derating factor is maintained SM<0.5 The derating factor is decreased According to a second aspect of the present disclosure, shown in FIG. 4, there is also provided a method 400 of operating a rechargeable energy storage system 220. The rechargeable energy storage system 220 is associated with at least a first load threshold $T_1$ and at least a second load threshold $T_2$, which is located further away from a zero electrical load value than the first load threshold $T_1$. The method comprises determining 401 a current electrical load value for said rechargeable energy storage system 220. If the current electrical load value is equal to the first load threshold $T_1$, or located further away from the zero electrical load value than the first load threshold $T_1$, the method comprises derating 402 the at least one electrical load 230, using a derating factor at least until the electrical load value is located closer to the zero electrical load value than the first load threshold $T_1$, wherein the derating factor is determined in accordance with any one of the steps according to the first aspect of the present disclosure, above.

Obviously, if the electrical load value is determined 401 as a positive electrical load value, only positive load thresholds, i.e. $+T_n$, are relevant for the method 400 for operating the rechargeable energy storage system 220. Similarly, if the electrical load value is determined 401 as a negative electrical load value, only negative load thresholds, i.e. $-T_n$, are relevant for the method 400 for operating the rechargeable energy storage system 220.

As illustrated in the flow chart of FIG. 4 and the example of FIG. 5, the electrical load value is repeatedly determined 401 as it varies during operation of the rechargeable energy storage system 220. At $t_{o1}$, the electrical load value is determined 401 to be equal to the first load threshold $T_1$. As it continues to rise, the electrical load 230 is derated 402 using the derating factor. At $t_{o2}$, the electrical load value is equal to the second load threshold $T_2$, whereupon the derating factor is either increased, maintained or decreased. In most scenarios, the derating factor is increased when the electrical load value is determined to exceed a load threshold further away from the first load threshold $T_1$, but there may be exceptions, as realized by a skilled person.

At $t_{c1}$, the electrical load value is again closer to zero electrical load than the first load threshold $T_1$ and the electrical load 230 is no longer derated.

In the case of a plurality of electrical loads 230, the plurality of electrical loads 230 are derated 402 according to a dynamic or static priority list, using the derating factor, until the electrical load value of the plurality of electrical loads 230 is located closer to the zero electrical load value than the first load threshold $T_1$. A dynamic priority list may in some situations prioritize a certain load, whereas in other situations the same load gets a low priority. Traction may, for instance be prioritized when a vehicle 300 is moving, whereas traction may not be prioritized at all when the vehicle is parked.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for determining a derating factor for a rechargeable energy storage system, said derating factor being indicative of the rate at which an electrical load, imparted on said rechargeable energy storage system, is reduced, said rechargeable energy storage system being associated with at least a first load threshold and at least a second load threshold being located further away from a zero electrical load value than the first load threshold, the method comprising:
   for an operating time range of said rechargeable energy storage system, detecting said electrical load and:
      when said electrical load is equal to said electrical first load threshold or is located between said electrical first load threshold and said second load threshold, determining an accumulated first load value indicative of the time during which, as well as the magnitude of how much, said electrical load extends from said first load threshold,
      when said electrical load is equal to said second load threshold or is located further away from a zero electrical load value than said second load threshold, determining an accumulated second load value indicative of the time during which, as well as the magnitude of how much, said electrical load extends from said second load threshold,
   determining a safety margin value by combining said accumulated first load value and said accumulated second load value and relating the thus combined values with said operating time range, and
   comparing said safety margin value to at least one safety margin threshold value in order to determine whether or not said derating factor should be modified.

2. The method according to claim 1, wherein the derating factor is either increased, reduced or maintained in dependence of the determined safety margin value.

3. The method according to claim 1, wherein said electrical load is indicative of electric current, alternatively electric power.

4. The method according to claim 1, wherein said feature of combining said accumulated first load value and said accumulated second load value comprises multiplying said accumulated first load value by a first weight factor and multiplying said accumulated second load value by a second weight factor.

5. The method according to claim 4, wherein the first weight factor and the second weight factor are determined dynamically in dependence of operating conditions.

6. The method according to claim 1, wherein said operating time range and/or said at least first load threshold and second load threshold are determined dynamically in dependence of operating conditions of the rechargeable energy storage system.

7. A method for operating a rechargeable energy storage system, the rechargeable energy storage system being associated with at least a first load threshold and at least a second load threshold being located further away from a zero electrical load value than the first load threshold, the method comprising:
   determining a current electrical load value for said rechargeable energy storage system, and
   if the current electrical load value is equal to said first load threshold or, located further away from said zero electrical load value than said first load threshold, derating the at least one electrical load, using a derating factor at least until the electrical load value is located closer to said zero electrical load value than said first load threshold, wherein said derating factor has been determined in accordance with claim 1.

8. The method according to claim 7, wherein for the step of derating a plurality of electrical loads, the plurality of electrical loads are derated according to a dynamic or static priority list, using the derating factor, until the electrical load value of the plurality of electrical loads is located closer to said zero electrical load value than said first load threshold.

9. A control unit configured to monitor and control at least one electrical load imparted on a rechargeable energy storage system according to the steps of claim 1.

10. A computer program comprising program code to cause the control unit of claim 9.

11. A computer readable medium having stored thereon the computer program of claim 10.

12. A power system comprising:
   a control unit according to claim 9,
   a rechargeable energy storage system,
   an interface connectable to at least one electrical load.

13. The power system according to claim 12, further comprising at least one electrical load.

14. An at least partly electrically powered vehicle or vessel comprising the power system according to claim 12.

* * * * *